(12) United States Patent
Hoffman et al.

(10) Patent No.: US 8,343,670 B2
(45) Date of Patent: Jan. 1, 2013

(54) USE EXTENDER DEVICE

(75) Inventors: Peter F. Hoffman, Avon, OH (US); Nir Weinstein, Bat-Hefer (IL); Michael Librus, Netanya (IL); William J. Moore, Lakewood, OH (US); Russell H. Toye, Jr., Avon, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 546 days.

(21) Appl. No.: 12/508,223

(22) Filed: Jul. 23, 2009

(65) Prior Publication Data

US 2010/0190040 A1 Jul. 29, 2010

Related U.S. Application Data

(63) Continuation of application No. PCT/US2008/052065, filed on Jan. 25, 2008.

(60) Provisional application No. 60/897,407, filed on Jan. 25, 2007.

(51) Int. Cl.
*H01M 12/06* (2006.01)
*H01M 12/08* (2006.01)

(52) U.S. Cl. ............. 429/407; 429/7; 429/100; 429/403

(58) Field of Classification Search ................... 429/407
See application file for complete search history.

(56) References Cited

U.S. PATENT DOCUMENTS

| | | | |
|---|---|---|---|
| 5,136,229 A | 8/1992 | Galvin | |
| 5,304,431 A | 4/1994 | Schumm, Jr. | |
| 5,356,729 A * | 10/1994 | Pedicini | 429/407 |
| 5,534,366 A | 7/1996 | Hwang et al. | |
| 5,635,814 A | 6/1997 | Afzal et al. | |
| 5,693,431 A | 12/1997 | Nierescher et al. | |
| 5,733,676 A | 3/1998 | Dopp et al. | |
| 5,739,596 A | 4/1998 | Takizawa et al. | |
| 5,780,992 A | 7/1998 | Beard | |
| 5,808,442 A | 9/1998 | Kaite et al. | |
| 5,814,969 A | 9/1998 | Banyas | |

(Continued)

FOREIGN PATENT DOCUMENTS

EP 0718951 A 6/1996

(Continued)

OTHER PUBLICATIONS

Patent Cooperation Treaty (PCT), International Search Report and Written Opinion for Application No. PCT/US2008/052002, filed Jan. 25, 2008, mailed Jul. 2, 2008, European Patent Office, Netherlands.

(Continued)

*Primary Examiner* — John S Maples
(74) *Attorney, Agent, or Firm* — Russell H. Toye, Jr.

(57) ABSTRACT

The use extender device (100) and method (700) thereof is provided, wherein the device (100) includes a housing (102) with a top cover (108) having a back side wall, front side wall, and lateral side walls. The device (100) further includes a bottom cover (106) operably attached to the top cover (108), and a battery cavity (130). The housing (102) can also include a circuit board cavity (116) defined by at least one of the top cover (108) and the bottom cover (106), a closing mechanism (114) attached to the top cover (108) and removably attaching the top cover (108) to the bottom cover (106), such that the battery cavity (130) is accessible, and at least one aperture (110) defined by at least one of the top cover (108) and bottom cover (106), wherein air flow into the battery cavity (130) is regulated by the aperture (110).

18 Claims, 8 Drawing Sheets

U.S. PATENT DOCUMENTS

| | | | |
|---|---|---|---|
| 5,831,350 | A | 11/1998 | McConkey et al. |
| 5,888,664 | A * | 3/1999 | Sieminski et al. ............ 429/407 |
| 5,903,131 | A | 5/1999 | Sekine et al. |
| 5,963,010 | A | 10/1999 | Hayashi et al. |
| 6,021,332 | A | 2/2000 | Alberth et al. |
| 6,043,626 | A | 3/2000 | Snyder et al. |
| 6,097,175 | A | 8/2000 | Yoon |
| 6,127,801 | A | 10/2000 | Manor |
| 6,127,809 | A | 10/2000 | Kates et al. |
| 6,184,654 | B1 | 2/2001 | Bachner, III et al. |
| 6,249,105 | B1 | 6/2001 | Andrews et al. |
| 6,314,308 | B1 | 11/2001 | Sheynblat et al. |
| 6,437,536 | B2 | 8/2002 | Higuchi |
| 6,475,658 | B1 * | 11/2002 | Pedicini et al. ............... 429/407 |
| 6,479,963 | B1 | 11/2002 | Manor et al. |
| 6,509,717 | B2 | 1/2003 | Lee |
| 6,583,601 | B2 | 6/2003 | Simoes et al. |
| 6,597,151 | B1 | 7/2003 | Price et al. |
| 6,660,418 | B1 | 12/2003 | Tinker et al. |
| 6,774,604 | B2 | 8/2004 | Matsuda et al. |
| 6,821,670 | B2 | 11/2004 | Hsueh |
| 6,864,664 | B2 | 3/2005 | Clift |
| 6,864,666 | B2 | 3/2005 | Breen et al. |
| 7,057,372 | B2 | 6/2006 | Chen et al. |
| 7,264,898 | B2 * | 9/2007 | Yang et al. ..................... 429/406 |
| 7,846,577 | B2 | 12/2010 | Kozu et al. |
| 2001/0003205 | A1 | 6/2001 | Gilbert |
| 2001/0020838 | A1 | 9/2001 | Malackowski |
| 2002/0039016 | A1 | 4/2002 | You Sun, II et al. |
| 2002/0093311 | A1 | 7/2002 | Stryker et al. |
| 2002/0101218 | A1 | 8/2002 | Koenck et al. |
| 2003/0094924 | A1 | 5/2003 | Oh |
| 2003/0205988 | A1 | 11/2003 | Vaisnys et al. |
| 2003/0220145 | A1 | 11/2003 | Erickson et al. |
| 2004/0021446 | A1 | 2/2004 | Bang et al. |
| 2004/0164715 | A1 | 8/2004 | Nawa et al. |
| 2004/0204171 | A1 | 10/2004 | Chien |
| 2004/0217739 | A1 | 11/2004 | Cummings |
| 2005/0077869 | A1 | 4/2005 | Yueh |
| 2005/0099156 | A1 | 5/2005 | Brenner |
| 2005/0127871 | A1 | 6/2005 | Orikasa |
| 2005/0162132 | A1 | 7/2005 | Nagasawa |
| 2005/0174094 | A1 | 8/2005 | Purdy et al. |
| 2005/0189909 | A1 | 9/2005 | Guthrie et al. |
| 2005/0280398 | A1 | 12/2005 | Lee et al. |
| 2006/0119324 | A1 | 6/2006 | Kim |
| 2006/0145661 | A1 | 7/2006 | Patino et al. |
| 2006/0208695 | A1 | 9/2006 | Weinstein et al. |
| 2006/0226805 | A1 | 10/2006 | Yu |
| 2006/0232243 | A1 | 10/2006 | Dabdoub et al. |
| 2007/0063669 | A1 | 3/2007 | Keating |

FOREIGN PATENT DOCUMENTS

| | | |
|---|---|---|
| EP | 696384 B1 | 12/1996 |
| EP | 1113562 A | 7/2001 |
| EP | 1185104 A | 3/2002 |
| EP | 1523081 A | 4/2005 |
| EP | 1569315 A | 8/2005 |
| EP | 1603008 A | 12/2005 |
| EP | 1715241 A | 10/2006 |
| EP | 1727223 A1 | 11/2006 |
| JP | 07-122249 A | 5/1995 |
| JP | 08-212992 A | 8/1996 |
| JP | 2002-056900 A | 2/2002 |
| KR | 20-0416155 Y1 | 5/2006 |
| WO | 9407293 A | 3/1994 |
| WO | 9749159 A | 12/1997 |
| WO | 0007275 A | 2/2000 |
| WO | 0122696 A | 3/2001 |
| WO | 0217460 A | 2/2002 |
| WO | 0241465 A2 | 5/2002 |

OTHER PUBLICATIONS

Patent Cooperation Treaty (PCT), International Search Report and Written Opinion for Application No. PCT/US2007/004627 filed Feb. 20, 2007, mailed Oct. 19, 2007, European Patent Office, Netherlands.

3COM Corporation, Handbook for Palm VII Organizer, 1998, 302 pages.

Research in Motion, RIM 950 & 957 Wireless Handhelds Installation and Getting Started Guide, 2001, 97 pages.

Shawn Barnett, Palm VII, Pen Computing Magazine, 1995-1999, 3 pages, http://pencomputing.com/palm/Reviews/palm7_main.html.

Motorola, TalkAbout Personal Interactive Communicator Model T900 User's Guide, 2000, title page, table of contents, pp. 1-53, notes and copyright page.

Eveready Battery Company, Inc., Eveready Carbon Zinc (Zn/MnO2) Application Manual, Nov. 6, 2001, pp. 1-13.

Eveready Battery Company, Inc., Eveready Cylindrical Alkaline Application Manual, Nov. 6, 2001, pp. 1-11.

Telephony Design, Blackberry (Research in Motion), Apr. 2, 2002, 3 pages, http://ptd.weblogger.com/stories/storyReader$136.

Eveready Battery Company, Inc., Energizer No. 1215 Engineering Datasheet, Oct. 2002, 2 pages, www.energizer.com.

Energizer, Application Manual Lithium Iron Disulfide (Li/FeS2), 2005, pp. 1-7, http://data.energizer.com.

Energizer Holdings, Inc. Energizer NH15-2500 Product Datasheet, Nov. 2005, 1 page, www.energizer.com.

Energizer Holdings, Inc. Energizer E91 Product Datasheet, Aug. 2006, pp. 1-2, www.energizer.com.

Energizer Holdings, Inc. Energizer L91 Product Datasheet, Sep. 2006, pp. 1-2, www.energizer.com.

Patent Cooperation Treaty (PCT), International Search Report and Written Opinion for Application No. PCT/US2008/000952, filed Jan. 24, 2008, mailed Jun. 20, 2008, European Patent Office, Netherlands.

Patent Cooperation Treaty (PCT), International Search Report and Written Opinion for Application No. PCT/US2007/004575, filed Feb. 20, 2007, mailed Dec. 18, 2007, European Patent Office, Netherlands.

Techtium, News & Events, Techtium Announces Launch of Mobile-UPS, an Analog Battery Management IC for Portable Devices, Sep. 4, 2001, 2 pages, http://www.techtium.com/news-september42001.htm.

Techtium, News & Events, On-board hybrid battery management chip makes built in mobile charging and UPS a reality, Feb. 28, 2002, 1 page, http://www.techtium.com/news-Feb28-2002.htm.

Sullivan, et al. The Heat Stake Advantage, Assembly update Plastics Assembly, Jan.-Feb. 2003, pp. 12-13, Specialized Assembly Systems LLC.

CHARGE2GO, Product Specs, 2004, 3 pages, http://www.chargetogo.com/specs.html.

Techtium Hybrid Management Technology, TCM-EXT06R8 External Charger Circuit from Single-Cell Primary Battery to GSM Cellular Phone datasheet, Jan. 2005, pp. 1-8, www.techtium.com.

Martinez, et al. Intersil Smart Battery Primer Application Note, Jul. 11, 2005, pp. 1-10, AN126.0, www.intersil.com.

Cellboost, Frequently Asked Questions, downloaded Feb. 8, 2006, 2 pages, http://www.cellboost.com/us/faq.htm.

Cellboost, How to Use Cellboost, downloaded Feb. 8, 2006, 3 pages, http://www.cellboost.com/us/how_irecharge.htm.

Cellboost, Products for Gameplayers, downloaded Feb. 8, 2006, 2 pages, http://www.cellboost.com/us/game_compatibility_psp1.htm.

Cellboost, How to Use iRecharge, downloaded Feb. 8, 2006, 2 pages, http://www.cellboost.com/us/how_irecharge.htm.

Techtium, Products, downloaded Feb. 8, 2006, 4 pages, http://www.techtium.com/products.htm.

Techtium Hybrid Battery Management Technology, TEC103 Step-Up Converter and Charger Controller from Primary Battery to NiCad or Li-Ion, Secondary Batteries datasheet, downloaded Feb. 9, 2006, pp. 1-28, http://www.techtium.com/PDF/TEC103.pdf.

Patent Cooperation Treaty (PCT), International Search Report and Written Opinion for Application No. PCT/US2008/005970, filed May 8, 2008, mailed Dec. 5, 2008, European Patent Office, Netherlands.

Office Action mailed on Jun. 23, 2008 in U.S. Appl. No. 11/385,209.

Office Action mailed on Jun. 12, 2008 in U.S. Appl. No. 11/360,789.

Patent Cooperation Treaty (PCT), Notification Concerning Transmittal of the International Preliminary Report on Patentability (Chapter I of the Patent Cooperation Treaty) for Application No. PCT/US2008/052002, filed Jan. 25, 2008, mailed Aug. 6, 2009.
Patent Cooperation Treaty (PCT), Notification of Transmittal of International Preliminary Report on Patentability for Application No. PCT/US2008/052065, filed Jan. 25, 2008, mailed May 25, 2009, Korean Intellectual Property Office, Korea.

Patent Cooperation Treaty (PCT), International Search Report and Written Opinion for Application No. PCT/US2008/052065, filed Jan. 25, 2008, mailed Jun. 3, 2008, Korean Intellectual Property Office, Korea.

* cited by examiner

USE EXTENDER DEVICE

CROSS-REFERENCE TO RELATED APPLICATION

This application is a continuation of International Patent Application No. PCT/US2008/052065, filed Jan. 25, 2008, and designating the United States, which claims the benefit of U.S. Provisional Patent Application No. 60/897,407, filed on Jan. 25, 2007, the entire disclosures of which are hereby incorporated herein by reference.

FIELD OF THE INVENTION

This invention is related generally to electronic devices and, more specifically, to devices and methods related to supplying power to electronic devices external to the device.

BACKGROUND OF THE INVENTION

The proliferation of portable battery powered devices, such as cellular telephones, has increased dramatically in the last several years and this trend is expected to continue. The phones typically use a rechargeable battery that is built into the phone to provide the needed power. The length of time that the battery powers the phone is dependent primarily upon the size of the battery and the number of energy consuming features built into the phone. In response to consumer demand, cell phone manufacturers incorporate into the phones features such as the ability to send and receive digital pictures and/or text messages. Unfortunately, the inclusion of these features usually places additional demands on the rechargeable batteries that power the cell phones. The net result is that the cell phones' run times become shorter and shorter due to the increased power demands. At the same time that the electrical demand placed on the battery is increasing, the size and weight of cell phones is decreasing in order to reduce the size of the phones. As the size of the cell phone is reduced, the size of the battery compartment built into the cell phone is also reduced. The existence of these two trends (i.e. increased electrical demand and reduced battery size) has caused many cell phone users to experience a failed telephone call or data transmission due to the depletion of their phone's battery at an inopportune moment. An additional trend that complicates resolving this problem is that most cell phones require a battery that has specific size and shape characteristics. In order to encourage consumers to purchase replacement batteries from the cell phone manufacturer, the cell phones are made with batteries that have unique shapes, locking mechanisms, voltage requirements, etc. Furthermore, the recharging port built into the cell phones can limit the type of charger that can be connected to the cell phone. Collectively, these factors limit the consumer's ability to rapidly replace the depleted battery with another power supply.

SUMMARY OF THE INVENTION

In accordance with one aspect of the present invention, a use extender device is provided that includes a housing. The housing includes a top cover having a back side wall, a front side wall, and lateral side walls, a bottom cover operably attached to the back side wall of the top cover, and a battery cavity defined by the top cover and bottom cover. The housing further includes a circuit board cavity defined by at least one of the top cover and the bottom cover, a closing mechanism attached to the top cover and removably attaching the top cover to the bottom cover, such that the battery cavity is accessible, and at least one aperture defined by at least one of the top cover and bottom cover, wherein air flow into the battery cavity is regulated by the at least one vent.

In accordance with another aspect of the present invention, a use extender device includes a housing, an interchangeable circuit board removably connected in a circuit board cavity, and a connector for electrically connecting the use extender device to an electronic device. The housing also includes a top cover, a bottom cover operably attached to the top cover, and a circuit board cavity defined by at least one of the top cover and the bottom cover.

In accordance with yet another aspect of the present invention, a method of determining air access includes the steps of selecting output characteristics of a zinc air prismatic cell, wherein the output characteristics include power output, and selecting use characteristics for the zinc air prismatic cell, wherein the use characteristics include on/off duty cycles. The method further includes the step of determining an air access amount according to the output characteristics and the use characteristics.

DETAILED DESCRIPTION OF THE INVENTION

Figure 1A:
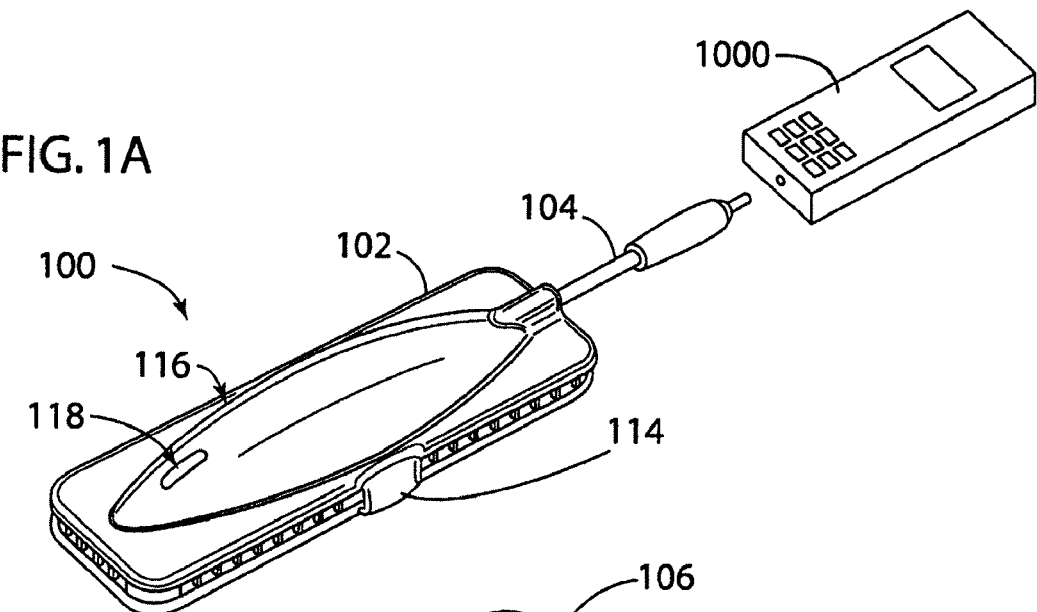
FIGS. 1A, 1B, 1C, and 1D illustrate a use extender device in accordance with an embodiment of the present invention.

Embodiments of the present invention facilitate electronic device operation by providing externally supplied power. As a result, electronic devices can be operated for extended periods of time, which exceed limitations of internal batteries.

FIGS. 1A, 1B, 1C, and 1D are diagrams that illustrate a use extender device 100 in accordance with an embodiment of the present invention. The use extender device 100 can be employed to supply power to a separate electronic device generally shown at reference identifier 1000, such as a cellular phone, portable multimedia device, personal digital assistant (PDA), notebook computer, and the like. The use extender device 100 can facilitate operation of such electronic devices by extending operation times beyond that of internal batteries provided inside the electronic device.

The device 100 includes a housing 102 and a connector 104, according to one embodiment. The housing 102 includes a top cover 108 and a bottom cover 106. The top cover 108 includes a circuit board cavity 116 on its interior that can house a circuit board 128. A circuit board cover 112 can be removably attached to the top cover 108 to enclose the circuit board cavity 116. Springs and/or contacts can be mounted on the circuit board cover 112 to provide an electrical connection to the circuit board cavity 116. The top cover 108 also includes front, back, and lateral side walls that extend down from the top cover 108. An exterior of the top cover 108 also includes a visual indicator 118 that indicates status or operation of the device. In this example, the visual indicator 118 comprises one or more light emitting diodes (LED). For example, the visual indicator 118 can indicate "in use" by emitting blue light. As another example, the visual indicator 118 can indicate "low power" by blinking.

Figure 1B:
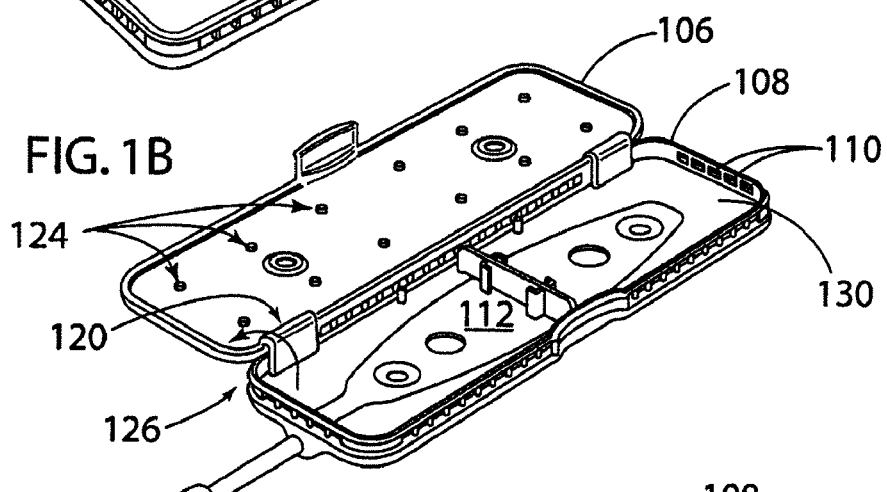
Figure 1C:
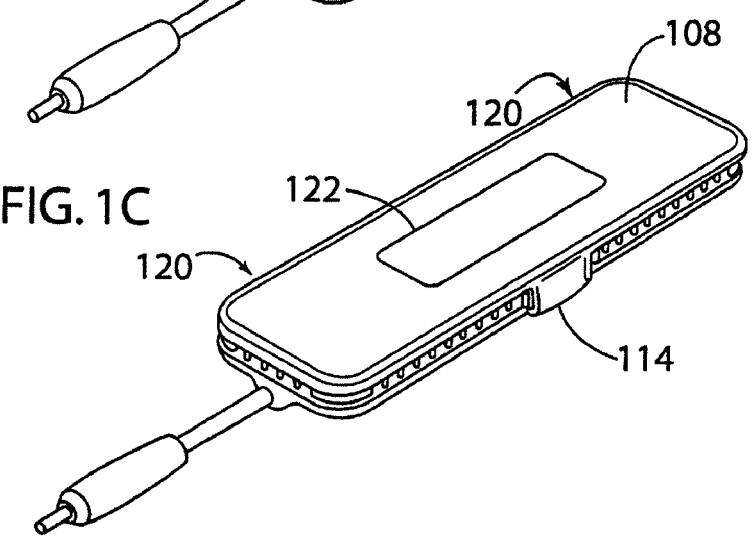
Figure 1D:
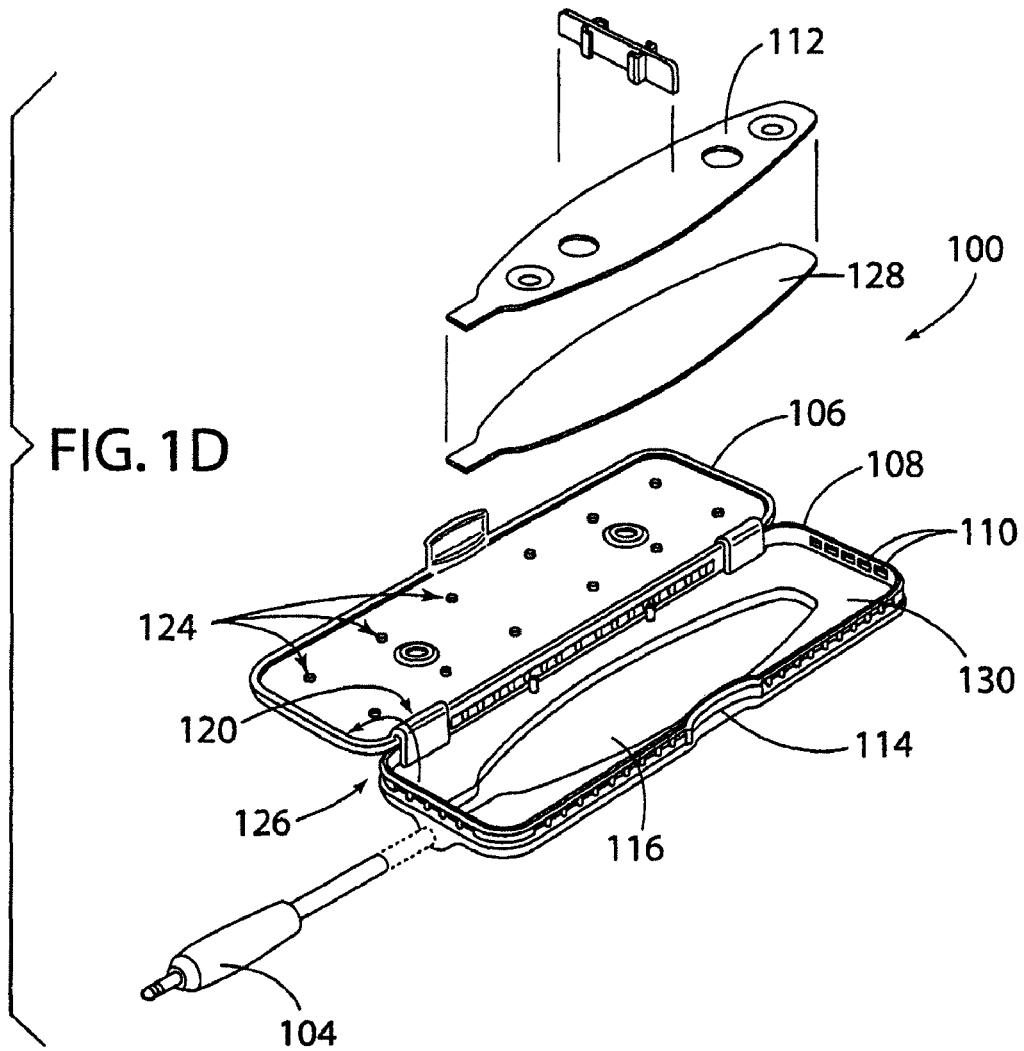

According to one embodiment, the bottom cover 106 is operably attached to the top cover 108, such that the bottom cover 106 is hingedly attached to the back side wall of the top cover 108. The operable attachment can include the bottom cover 106 pivoting about one or more points of the top cover 108 to make the battery cavity 130 accessible, or the bottom cover 106 completely detaching from the top cover 108 to make the battery cavity 130 accessible. Hinge mechanisms 120 attach the top cover 108 to the bottom cover 106 as shown in FIGS. 1B and 1C. The bottom cover 106 and the top cover 108 define a battery cavity 130 between the covers 106 and 108 when in a closed position as shown in FIG. 1A. An open position is shown in FIG. 1B for removing and/or inserting batteries. In this example, the open position permits an open angle 126 of about one hundred eighty degrees) (180°).

The bottom cover 106 is attached to the front side wall of the top cover 108 by an attachment mechanism 114, such as a clip. Additionally, the bottom cover 106 includes protrusions 124, such as balls, on its interior surface. The protrusions 124 provide an air gap, which can facilitate operation of inserted batteries, such as zinc air prismatic batteries. Apertures or vents 110 can be located on the bottom cover 106, the lateral side walls, and/or the top cover 108 in order to control and/or regulate flow of a fluid (e.g. air) to a fluid consuming battery. The regulation of air to inserted batteries can thus be controlled by appropriately sizing and placing the vents 110. Thus, the air flow of the air that enters through the vents 110 around the zinc air prismatic batteries can be increased or controlled by the protrusions 124. According to one embodiment, the protrusions 124 can be placed on the bottom cover 106, the top cover 108, or a combination thereof.

According to an alternate embodiment, the bottom cover 106 and the top cover 108 are slidably attached to one another. Thus, the bottom cover 106 and the top cover 108 can have corresponding flanges that define grooves that longitudinally extend along parallel sides of the bottom and top covers 106,108. For purposes of explanation and not limitation, the top cover 108 can have first and second flanges that define a groove and the bottom cover 106 can have a flange that slidably engages the groove of the top cover 108 when providing access to the battery cavity 130. The flange of the bottom cover 106 can slide completely through the groove of the top cover 108, such that the bottom cover 106 and top cover 108 can be completely detached from one another to provide access to the circuit board cavity 116. Alternatively, the flange of the bottom cover 106 can slide through a portion of the groove of the top cover 108, such that the bottom cover 106 and top cover 108 do not completely detach from one another when the battery cavity 130 is accessible. It should be appreciated by those skilled in the art that the bottom cover 106 can have the top and bottom flanges that define the groove and the top cover 108 can include the flange that slidably engages the groove of the bottom cover 106 when providing access to the battery cavity 130.

According to yet another embodiment, the bottom cover 106 and top cover 108 can include one or more suitable fasteners for mechanically attaching the bottom cover 106 to the top cover 108. Typically, the when the fasteners release the bottom cover 106 from the top cover 108, the bottom cover 106 and top cover 108 are completely detached from one another in order to provide access to the battery cavity 130. However, it should be appreciated by those skilled in the art that the bottom cover 106 and top cover 108 can be attached to one another using other suitable devices, wherein the bottom cover 106 and top cover 108 are attached when the battery cavity 130 is accessible, and wherein the bottom cover 106 and top cover 108 are not completely detached from one another when the battery cavity 130 is accessible. It should further be appreciated by those skilled in the art that the housing 102 can be a permanent housing, such as the bottom cover 106 and top housing 108 are a single component or not removable from one another.

An exterior of the bottom cover 108 includes a plate 122 as shown in FIG. 1C. The plate 122 can include identifying information about the device, safety instructions, operating instructions, and the like. Alternately, the plate 122 facilitates attachment to other devices, for example, by adhesion, magnets, brackets, and the like.

The connector 104 is coupled to the top cover 108 and provides an electrical connection to the circuit board cavity 116. The connector 104 can be coupled to electronic devices, such as cell phones, smart phones, personal digital assistants, portable audio devices, portable media devices, and the like.

According to one embodiment, an interchangeable circuit board 128 can be in the circuit board cavity 116 that can be defined by the top cover 108 and the circuit board cover 112. Thus, the interchangeable circuit board 128 can be removed and replaced by a user or manufacturer with another interchangeable circuit board 128 in the circuit board cavity 116 in order for the interchangeable circuit board 128 to be compatible with the electronic device 1000 connected to the device 100 or to be compatible with the type of battery to be used in the use extender. The interchangeable circuit board 128 can include hardware circuitry, one or more software routines, or a combination thereof, that is specific to or corresponds with the electronic device 1000 connected to the device 100. By way of explanation and not limitation, substantially all of the components of the device 100 can be the same without regard to the electronic device 1000 that the device 100 is connected to, and the interchangeable circuit board 128 can be selected and placed in the circuit board cavity 116 based upon the connected electronic device 1000. Therefore, multiple interchangeable circuit boards 128 can be designed based upon the available electronic devices 1000 that can be connected to the device 100, and the desired interchangeable circuit board 128 can be placed in the circuit board cavity 116 by a manufacturer of the device 100, a manufacturer of the electronic device 1000, an assembler that differs from the manufacture of the device 100, the interchangeable circuit board 128, and the electronic device 1000; or the interchangeable circuit board 128 can be placed in the circuit board cavity 116 by the user of the device 100.

According to an alternate embodiment, the interchangeable circuit board 128 can include a housing that covers a portion of the interchangeable circuit board 128. Typically, the device 100 can include one of the top cover 108 and bottom cover 106, and the housing of the interchangeable circuit board 128 forms the other cover (e.g. circuit board cover 112) when the interchangeable circuit board 128 is placed in the circuit board cavity 116. For purposes of explanation and not limitation, the top cover 108 defines the circuit board cavity 116, and when the interchangeable circuit board 128 is placed in the circuit board cavity 116, the housing of the interchangeable circuit board 128 is on an exterior side of the interchangeable circuit board 128 that is opposite the circuit board cavity 116. Thus, the interchangeable circuit board 128 is placed in the circuit board cavity 116, and is enclosed by the top cover 108 and the housing of the interchangeable circuit board 128.

By way of explanation and not limitation, the interchangeable circuit board 128 can be connected or attached in the circuit board cavity 116 by the interchangeable circuit board 128 having a defined shaped that corresponds to the shape of the circuit board cavity 116. According to an alternate embodiment, the circuit board cover 112 can be mechanically connected to the top cover 108, wherein the circuit board cover 112 secures the interchangeable circuit board 128 in the circuit board cavity 116 to maintain the electrical connection between the interchangeable circuit board 128 and the device 100. In such an embodiment, the circuit board cover 112 can be mechanically attached to the top cover 108 by screws that extend through the circuit board cover 112 and into the top cover 108. The screws can also extend through the interchangeable circuit board 128 to secure the interchangeable circuit board 128 in the circuit board cavity 116.

According to another alternate embodiment, the interchangeable circuit board 128 can be secured in the circuit board cavity 116 by the electrical connection between the interchangeable circuit board 128 and the device 100 (e.g., by plugging one or more electrical contacts on the interchangeable circuit board 128 into corresponding electrical contacts in or adjacent to the circuit board cavity 116). Another exemplary embodiment of the interchangeable circuit board 128 being secured by the electrical contacts of the device 100, is the interchangeable circuit board 128 being secured by a spring that biases the interchangeable circuit board 128 towards a second electrical contact (e.g., cylindrical shaped batteries in a device).

Alternatively, that interchangeable circuit board 128 can be secured by the electrical connection with the device 100, such that the circuit board cavity 116 is a slot defined in the bottom cover 106 or top cover 108 (e.g., a subscriber identity module (SIM) card for a cellular telephone or a secure digital (SD) card for a digital camera). In such an embodiment, the circuit board cavity 116 can be accessible when the bottom cover 106 and top cover 108 are in an open position to provide access to the battery cavity 130, when the circuit board cover 112 is positioned to provide access to the circuit board cavity 116, or on the side of the device 100, such that the interchangeable circuit board 128 can be inserted and removed from the circuit board cavity without altering the position of the bottom cover 106, the top cover 108, or the circuit board cover 112.

The interchangeable circuit board 128 and the connector 104 can be parts of a single, integral, interchangeable unit, according to one embodiment. When the interchangeable circuit board 128 is placed in the circuit board cavity 116 based upon the electronic device 1000 that is to be connected to the device 100, the connector 104 that is part of the interchangeable unit can be compatible with the electronic device 1000.

According to an another embodiment, the connector 104 is interchangeable from a fixed or permanent circuit board in the circuit board cavity 116 or the interchangeable circuit board 128 placed in the circuit board housing 116. Thus, if the fixed or interchangeable circuit board 128 in the circuit board cavity 116 is compatible with the electronic device 1000, the connector 104 can be interchanged in order for the connector to be compatible to the electronic device 1000. In such an embodiment, the housing 102 can be a permanent housing, such that the connector 104 can be interchanged with separating the bottom cover 106 from the top cover 108. According to an alternate embodiment, the connector 104 is separate from the device 100, and can be coupled with the electronic device 1000.

According to either embodiment, wherein the circuit board is permanent or interchangeable, the connector 104 can include circuitry that is specific to the electronic device 1000 connected to the device 100. Thus, the circuit board can be compatible with multiple types of electronic devices 1000, and the connector 104 can include additional hardware circuitry, one or more software routines, or a combination thereof that is specific to the electronic device 1000.

In one example, the device 100 includes two metal air (e.g., zinc air) prismatic battery cells. For insertion, the cells can be placed against the interior surface of the top cover 108 between the side walls while the device 100 is in the open position. Alternatively, the device 100 can include alkaline zinc type batteries with manganese dioxide ($MnO_2$), nickel oxyhydroxide (NiOOH), silver oxide, or a combination thereof as an active cathode material, a rechargeable nickel cadmium (Ni/Cd) or nickel metal hydride (NiMH) cell battery, a zinc manganese dioxide ($Zn/MnO_2$) cell battery with an acidic electrolyte containing a chloramine ($NH_2Cl$), a zinc chloride ($ZnCl_2$), or a combination thereof, a lithium (Li) cell battery, or a lithium-ion (Li-Ion) cell battery. Additionally or alternatively, the cell or battery shapes can be, but are not limited to, cylindrical, prismatic, button, or the like. Further, single or multiple cell batteries can be used, and one or more multiple cell batteries can be used. However, it is appreciated that other types of batteries can be employed. In embodiments that do not use a metal air battery, it may be desirable to omit the vents 110.

It is noted that appropriate sizing of the vents 110 facilitates operation of zinc air prismatic battery cells as the inserted cells. Factors include air access and path length. Air access is the rate of air volume per minute (air/minute) that provides oxygen for operation of the cell. Path length includes distance from cells or portions of cells to particular vents. An example of suitable air access is air access of about 17-35 cc air/minute (depending on reaction kinetics) provides enough oxygen to discharge a zinc air cell at 1000 mA. This is the stoichiometric amount typically needed at the air electrode; in practice the real need for air can be higher depending on how direct the air paths are from ambient to inside a device cavity.

In one example, a zinc air prismatic cell has enough open area to discharge at about 1000 mA. The vents 110 are sized to provide air access of about 17-35 cc air/minute. In another example, the vents 110 are sized to provide a lower amount of air access to yield lower discharge rates of the inserted cells.

It is noted that extensively exposing zinc air prismatic cells to air environment can degrade their performance due to exposure to carbon dioxide and/or loss/gain of water, thus the vents 110 can be sized to mitigate exposure and, as a result, prolong use of the cells and yet yield suitable performance. In one embodiment, the cells include an active air manager there on. The active air manager extends life or use of the cells but does reduces energy density because of the air manager's inclusion on the cells. For example, such an air manager can reduce the energy density from about 900 Wh/L to about 600 Wh/L. Examples of suitable air managers included on the cells are included in U.S. patent application Ser. No. 11/733,980 entitled "BATTERY INCLUDING A FLUID MANAGER", now U.S. Pat. No. 7,858,226, the contents of which are hereby incorporated herein by reference in their entirety. In another example, the vents 110 are sized so as to limit exposure yet permit a suitable given discharge rate. Air managers can include valves that can be opened and closed either manually or electronically, when a switch is turned on or off by the user. Valve operation can be responsive to changes in the power requirements of the electronic device 1000 being operated by the device 100, using control circuitry that proves electrical communication between the device and the air manager to open and close the valve in proportion to the amount of oxygen needed by the battery. Air managers can be located within the cell, battery, device 100 housing, or electronic devices 1000 being powered by the device 100. Air managers can include devices for acceleration air flow, such as, but not limited to, fans, bellows, the like, or a combination thereof.

As an example, a 1000 mA rate capable zinc air prismatic cell includes about 27 mm2 of vents on the cell to provide suitable air access. About 200 mm2 of air access yielded by the vents 110, in this example, yields a suitable discharge for two such cells. Thus, 4 slots or vents each 38 mm by 1.3 mm in the housing 102 provide suitable air access for this example (about 200 mm2). In another example, 290 vents of 0.83 mm by 0.83 mm yield about 200 mm2 and provide suitable access for this example. In yet another example, 73 square vents of 1.65 mm by 1.65 mm yield 200 mm2 and provide suitable air access for this example.

Figure 6:
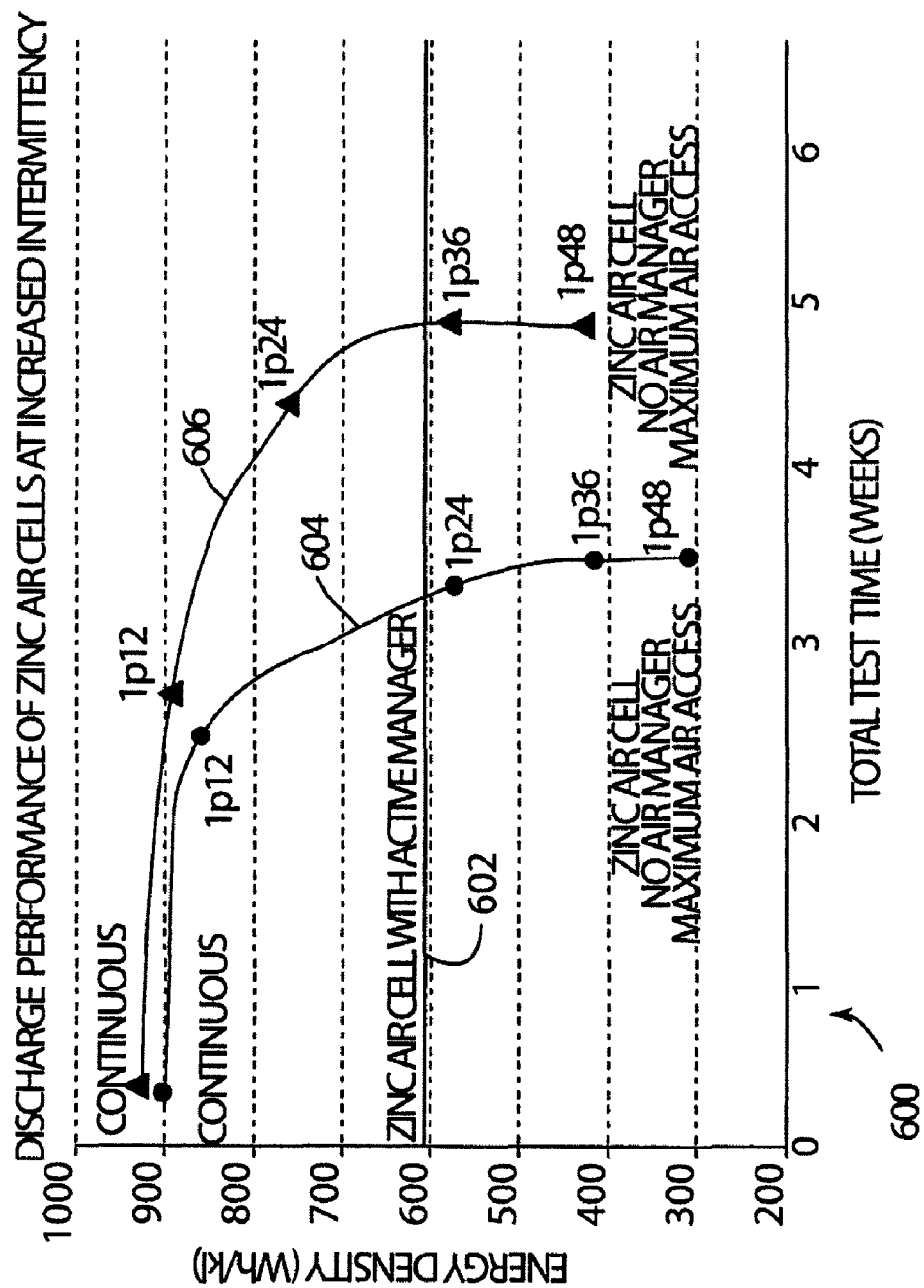
FIG. 6 is a chart depicting discharge performance of zinc air prismatic cells according to use intermittency.
Figure 7:
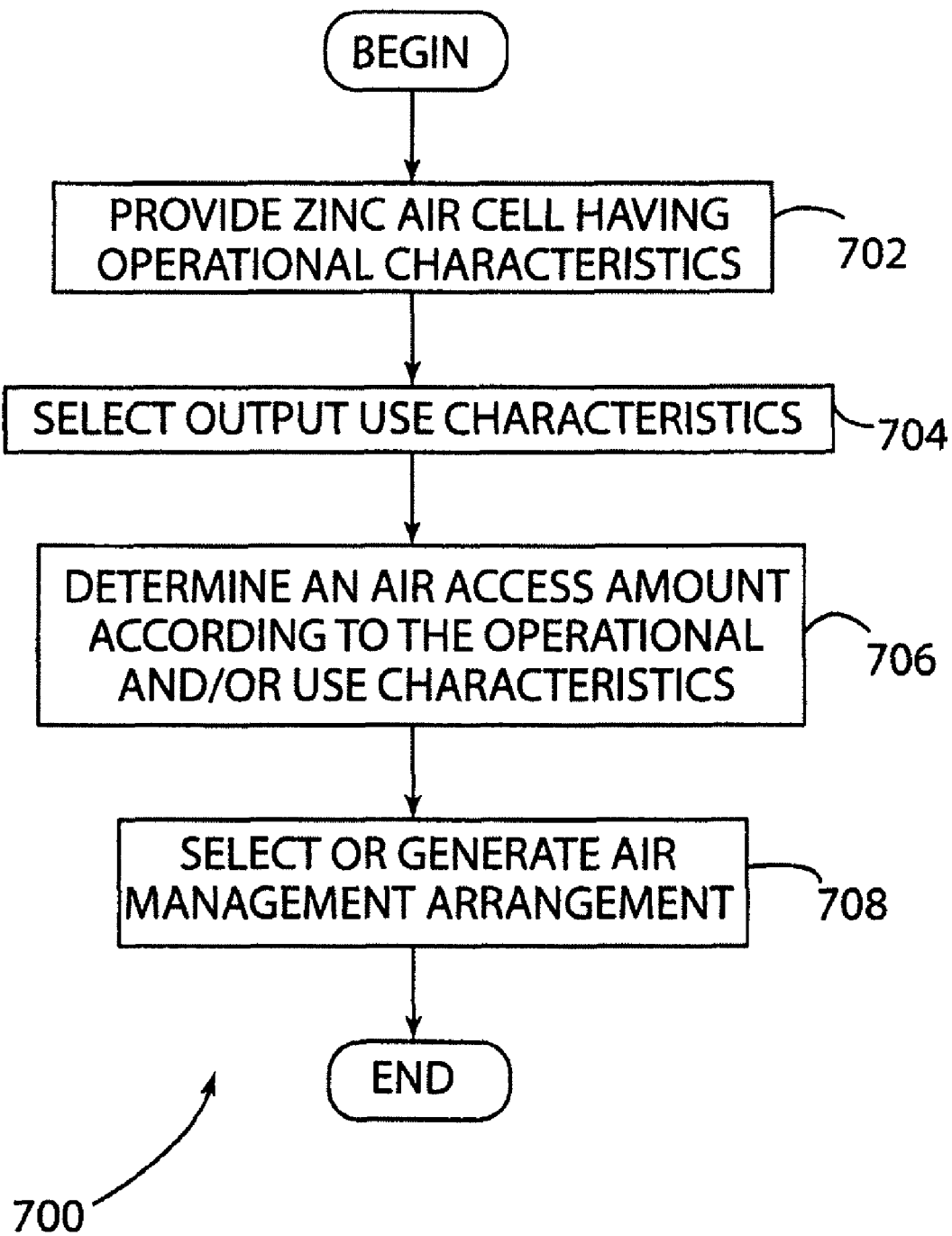
FIG. 7 is a flow diagram illustrating a method of determining air access for an external power device employing zinc air prismatic cells in accordance with an embodiment of the invention.

A further discussion of air access for zinc air prismatic cells is provided infra in regards to FIGS. 6 and 7. Additionally, it is noted that the device 100 is not limited to zinc air prismatic cells and can employ other battery types and power sources, as described above.

The device 100 is provided as an example for illustrative purposes. It is appreciated that variations of the device 100 are permitted and contemplated in accordance with the invention.

Figure 2A:
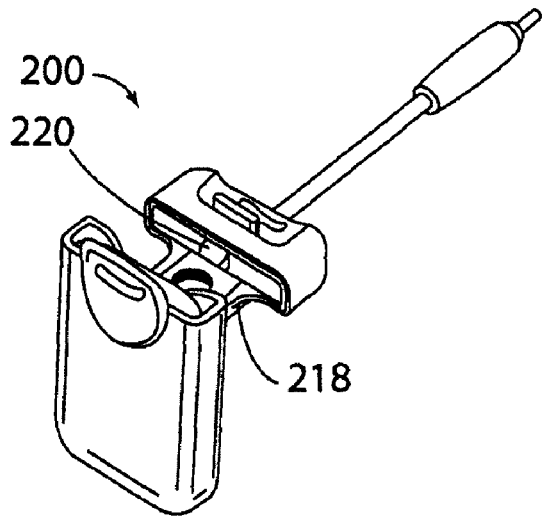
FIGS. 2A, 2B, and 2C are diagrams that illustrate another use extender device in accordance with another embodiment of the present invention.
Figure 2B:
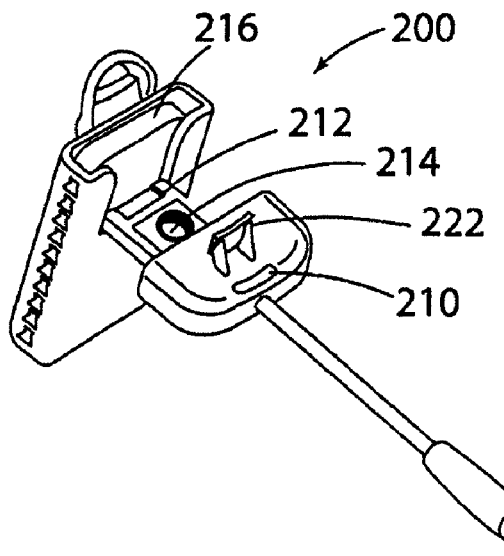
Figure 2C:
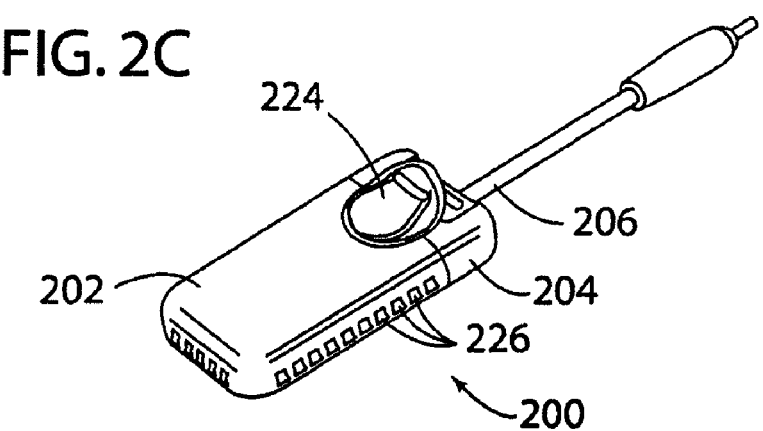
Figure 3A:
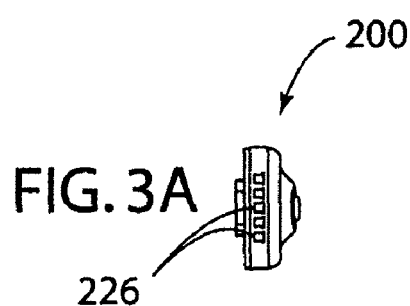
FIGS. 3A to 3E are diagrams that further illustrate the use extender device shown in the embodiment in FIGS. 2A-2C.
Figure 3B:
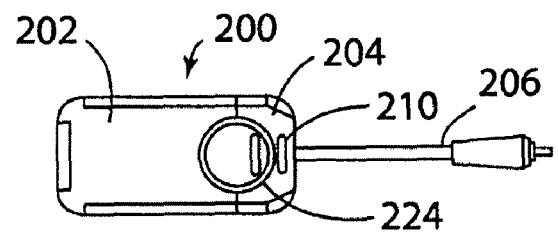
Figure 3C:
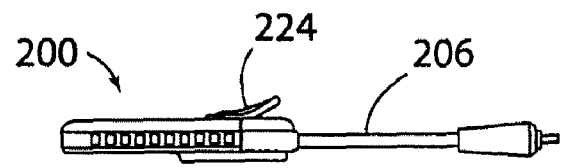
Figure 3E:
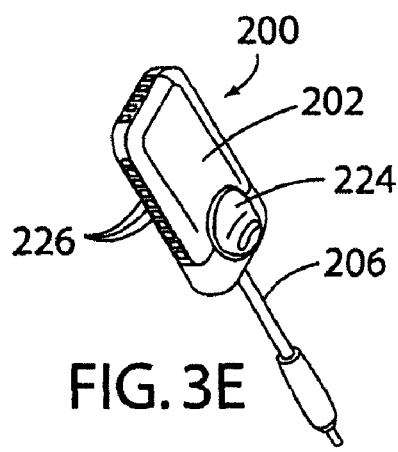
Figure 3D:
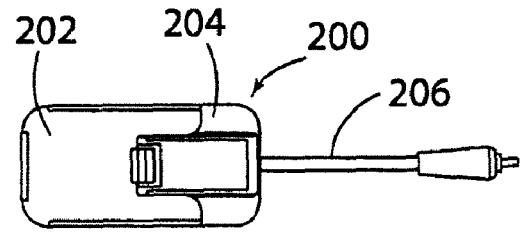

FIGS. 2A, 2B, and 2C are diagrams that illustrate another use extender device 200 in accordance with an embodiment of the present invention. The use extender device 200 can be employed to supply power to the electronic device 1000, such as a cellular phone, portable multimedia device, personal digital assistant, notebook computer, and the like. The use extender device 200 can facilitate operation of such electronic devices by extending operation times beyond that of internal batteries.

The use extender device 200 includes a lower housing 202, an upper housing 204, and a connector 206. An interior of the lower housing 202 defines a battery cavity 130 into which one or more battery cells 216 can be inserted. In one example, the cells 216 include a single zinc air prismatic cell. In another example, the cells 216 include two zinc air prismatic cells. The lower housing 202 includes vents or apertures 226 to facilitate air access and air regulation for inserted cells. The configuration and arrangement of the vents 226 are similar to that described above in reference to FIGS. 1A to 1C. It is appreciated that alternate aspects of the invention may not include vents 226.

The upper housing 204 further defines the battery cavity 130 for the inserted cells 216 when in a closed position, such as shown in FIG. 2C. An interior of the upper housing 204 includes a circuit board cavity for housing device circuitry. The upper housing 204 is hingedly attached to the lower housing 202 by a contact member 218 connected to a hinge mechanism 212. Thus, the upper housing 204 can be rotated about the hinge mechanism 212 to alternate from the closed position to a range of open positions. The contact member 218 includes a first contact 214 attached thereon. The upper housing 204 also includes a visual indicator 210 that indicates status or operation of the device 200. In one example, the visual indicator 210 includes one or more light emitting diodes (LEDs).

The upper housing 204 also includes a second contact 220. The first contact 214 and the second contact 220 are in electrical contact with the device circuitry, which in turn can then supply power to the separate electronic device. For zinc air prismatic cells as the inserted cells 216, the second contact 220 can operate as a positive contact and can be edge contacted with the inserted cells to mitigate damage and/or shorting from improperly inserted cells and provide a measure of reversal protection.

A connection mechanism 224 is affixed to the lower housing 202 on a side opposite the hinge attachment mechanism 212. The connection mechanism 224 couples to a connection member 222 affixed to the upper housing 204. It should be appreciated by those skilled in the art that the embodiments described above in regards to the device 100 with respect to at least the housing 102, the connector 104, the bottom cover 106, the top cover 108, the circuit board cover 112, the circuit board cavity 116, and the interchangeable circuit board 128 are applicable to the device 200.

The device 200 is provided as an example for illustrative purposes. It is appreciated that variations of the device 200 are permitted and contemplated in accordance with the invention.

FIGS. 3A to 3E are diagrams that further illustrate the device 200 in accordance with an embodiment of the invention. Example dimensions are shown in the figures in millimeters.

Figure 4:
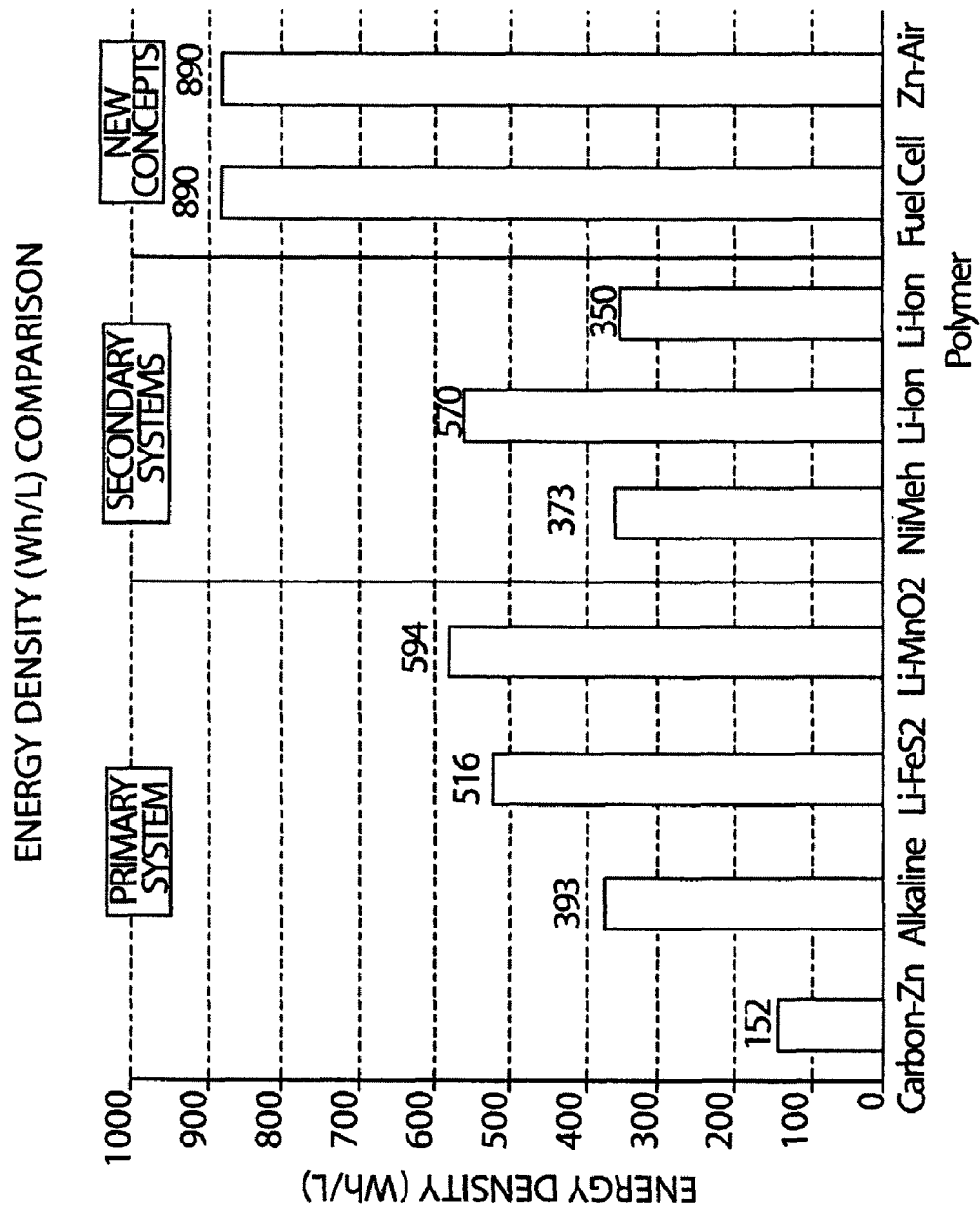
FIG. 4 is a chart illustrating energy density of examples of various battery chemistries that can be employed in the present invention.

FIG. 4 is a chart illustrating energy density of examples of various battery chemistries that can be employed in the present invention. It is noted that zinc air prismatic provides an energy density of more than twice that of alkaline.

Figure 5:
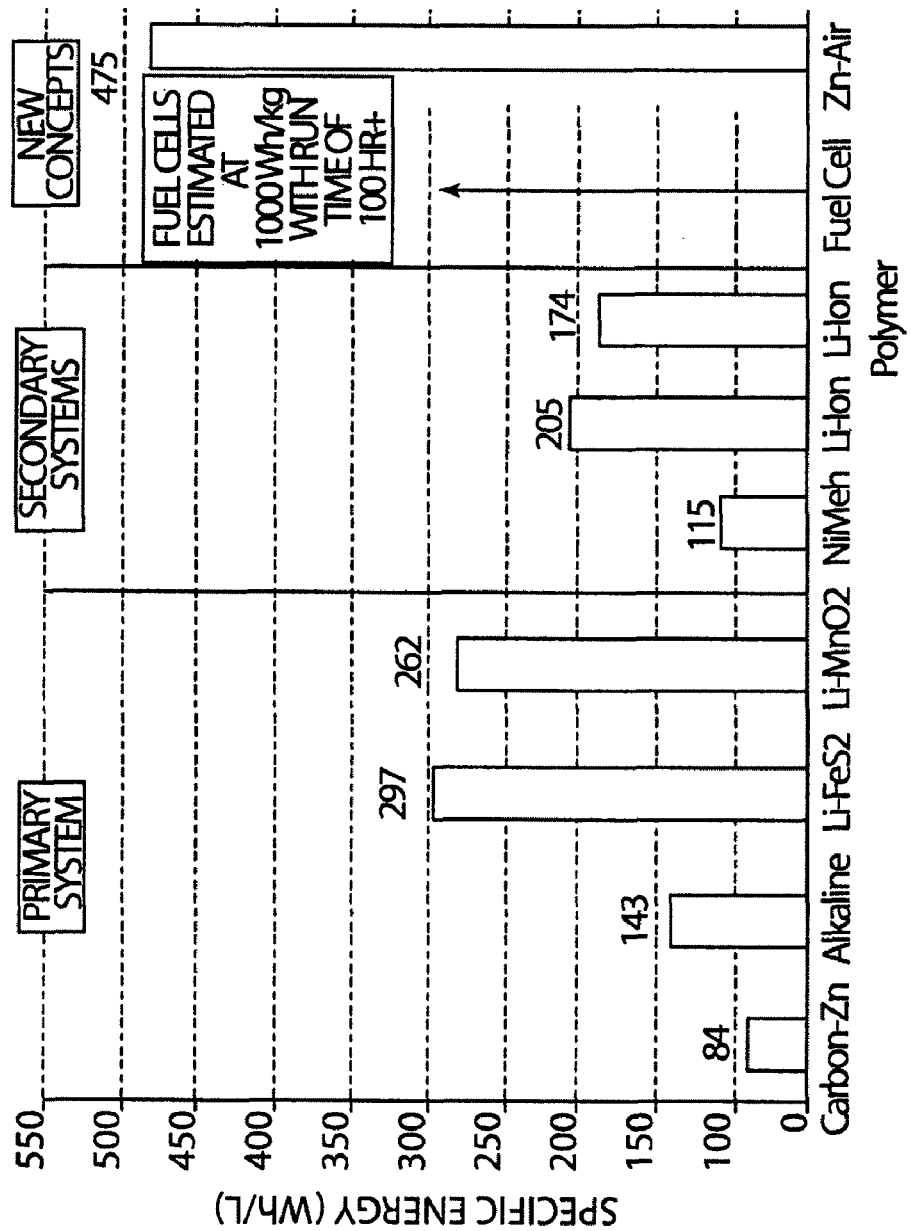
FIG. 5 is a chart illustrating specific energy of examples of various battery chemistries that can be employed in the present invention.

FIG. 5 is a chart illustrating specific capacity of examples of various battery chemistries that can be employed in the present invention. It is noted that zinc air provides a capacity over 3 times greater than that of alkaline.

FIG. 6 is a chart 600 depicting discharge performance of zinc air prismatic cells according to use intermittency and degree of air management. The chart 600 is provided as an example to illustrate various air management techniques. An x axis indicates total test time and a y axis indicates energy density.

Line 602 depicts example characteristics for a first zinc air cell with an active air manager therein. The active air manager controls air access to the cell such that when the cell is not being used, degradation from H2O and/or carbon dioxide is mitigated. It can be seen that the initial energy density is relatively lower due to the added volume of the air manager being included in the cell.

Line 604 depicts example characteristics for a second zinc air cell without an air manager that receives full air access during use and non use periods. The points on the line correspond to intermittent use in terms of an hour of use per hours. For example, 1p12 relates to 1 hour of use over a 12 hour period and 1p36 relates to 1 hour of use over a 36 hour period. Initially, the second zinc air cell has a greater energy density than that of the first zinc air cell. However, over time, degradation from H2O and/or carbon dioxide occurs and the energy density lowers due to the full, constant air access. As a result, the energy density of the second cell becomes lower than that of the first cell for low intermittent discharge (1p24, 1p36, and 1p48).

Line 606 depicts example characteristics for a third zinc air cell with a passive air manager that continuously limits air access during both use and non use periods. As with the second zinc air cell, the third zinc air cell has a greater energy density than that of the first zinc air cell. The passive air manager, such as the vents 110 of FIGS. 1A-1C, are adjusted or configured to limit air access to a selected discharge rate, also referred to as tuning. Based on the stoichiometric requirement of air to discharge the cell, the passive air manager is designed to allow enough or sufficient air flow to access the cell. If air access is restricted beyond a threshold limit, the cell will not operate suitably, such as by not providing sufficient power. However, at a derived value of air access, suitable performance can be obtained while mitigating cell degradation and extending use time. It is noted that the suitable performance can be, but is not necessarily, less than a rated performance for a given zinc air cell.

Over time, degradation from H2O and/or carbon dioxide still occurs, but the cell degradation is slower than the second zinc air cell due to the passive air manager. As a result, the energy density of the third zinc air cell is typically greater than that of the second zinc air cell, which has no air access management at a given total test time.

FIG. 7 is a flow diagram illustrating a method 700 of determining air access for an external power device employing zinc air prismatic cells in accordance with an embodiment of the invention.

The method 700 begins at block 702, wherein a zinc air prismatic cell is provided. The cell has operational characteristics including open voltage, range of current output, current limit, capacity, lifetime, use time, and the like.

Output use characteristics for the cell are selected at block 704. The use characteristic include range of current output, current limit, lifetime, use time, intermittent use, and the like. The current limit of the use characteristics can be equal to or less than the current limit of the cell operational characteristics. The intermittent use includes expected periods of use and non use of the cell. For example, an expected intermittent use may be 1 hour for every 23 hours of non use. The use time is a sum of hours of operational use of the cell and excludes "off" time periods.

An air access amount, which includes air flow, is determined for the zinc air cell according to the use characteristics and/or the operational characteristics of the zinc air cell at block 706. The air access amount is selected to yield the use characteristics while mitigating degradation due to H2O and/or carbon dioxide exposure and thereby extending use time.

A vent or air management arrangement for a housing is selected at block 708. The vent arrangement, such as the vents 110 of FIGS. 1A to 1C, can be configured as slots, rectangular apertures, circular apertures, and the like in the housing. The housing can include, for example, a device housing, a battery pack housing, a use extender housing, a cellular phone housing, a portable media player housing, and the like.

It is understood that the embodiments shown in the drawings and described above are merely for illustrative purposes and are not intended to limit the scope of the invention. In this document, relational terms, such as first and second, top, bottom, and side, and the like may be used to distinguish one entity or action from another entity or action, without necessarily requiring or implying any actual such relationship or order between such entities or actions. Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Also, the term "exemplary" is intended as an example, not necessarily as a best or superior solution. Furthermore, to the extent that the term "includes" is used in either the detailed description or the claims, such term is intended to be inclusive in a manner similar to the term "comprising."

What is claimed is:

1. A use extender device for supplying power to a separate electronic device, said use extender device comprising:
   a housing comprising:
      a top cover having a back side wall, front side wall, and lateral side walls;
      a bottom cover operably attached to the back side wall of the top cover;
      a battery cavity defined by the top cover and the bottom cover;
      a circuit board cavity defined by at least one of the top cover and the bottom cover, wherein the circuit board cavity is adapted to receive a circuit board;
      a closing mechanism attached to the top cover and removably attaching the top cover to the bottom cover, such that the battery cavity is accessible; and
      at least one aperture, wherein air flow into the battery cavity is regulated by the at least one aperture;
   a fluid consuming battery in the battery cavity, wherein the fluid is air and the at least one aperture in the housing regulates a flow of air into the fluid consuming battery;
   a connector, coupled to the housing, that is capable of electrically connecting the battery to a separate electronic device, wherein the connector is interchangeable to be compatible with the electronic device; and
   a plurality of interchangeable circuit boards each configured for a different electronic device, a different electrical output or electrical input from a different battery type, wherein a selected one of the plurality of interchangeable circuit boards is connected in the circuit board cavity such that the selected interchangeable circuit board corresponds to an electronic device electrically connected to the use extender device through the connector.

2. The device of claim 1, wherein the battery comprises a metal air battery.

3. The device of claim 1, wherein the battery includes an air manager, wherein the air manager regulates the air flow in the battery cavity.

4. The device of claim 1, further comprising a least one protrusion extending from an interior surface of at least one of the top cover and bottom cover, wherein the at least one protrusion defines an air volume in the battery cavity.

5. The device of claim 1, wherein the selected interchangeable circuit board is mechanically connected in the circuit board cavity.

6. The device of claim 1, wherein the selected interchangeable circuit board is connected in the circuit board cavity by at least one electrical connection point of the interchangeable circuit board.

7. The device of claim 2, wherein the at least one aperture regulates the air flow in the battery cavity at a rate of approximately 17-35 cc air/minute.

8. The use extender device of claim 1, wherein the connector and the selected circuit board are combined in an integral interchangeable unit.

9. The device of claim 1, wherein the use extender device supplies power to the separate electronic device to extend operation times beyond that of internal batteries provided inside the separate electronic device.

10. The device of claim 1, wherein the selected interchangeable circuit board and interchangeable connector are parts of a single integral interchangeable unit.

11. The device of claim 1, wherein the top cover pivots relative to the bottom cover between open and closed positions.

12. The device of claim 11, wherein the top cover pivots about 180° relative to the the bottom cover.

13. The device of claim 1, wherein the top cover slides relative to the bottom cover to open and close the housing.

14. A use extender device for supplying power to a separate electronic device, said use extender device comprising:
- a housing comprising a top cover, a bottom cover, and side walls defining a battery cavity, the housing further comprising at least one aperture for regulating fluid flow into the battery cavity;
- a fluid consuming battery disposed in the battery cavity, wherein the at least one aperture in the housing regulates a flow of fluid into the fluid consuming battery;
- an electrical connector coupled to the housing and capable of electrically connecting the battery to an input of a separate electronic device to supply power from the fluid consuming battery to extend operations beyond that of internal power provided inside the separate electronic device, wherein the connector is interchangeable to be compatible with the separate electronic device, wherein the connector is compatible only with a certain type of electronic device;
- an interchangeable circuit board removably connected in a circuit board cavity, such that the interchangeable circuit board corresponds to an electronic device electrically connected to the use extender device through the connector, and wherein the circuit board is compatible only with the certain type of electronic device, and further comprising a plurality of interchangeable circuit boards, each configured for a different electronic device, a different electrical output or electrical input from a different battery type, wherein one of the plurality of interchangeable circuit boards is employed in the circuit board cavity at a time.

15. The device of claim 14, wherein the interchangeable circuit board and interchangeable connector are parts of a single integral interchangeable unit.

16. The device of claim 14, wherein the top cover pivots relative to the bottom cover between open and closed positions.

17. The device of claim 16, wherein the top cover pivots about 180° relative to the bottom cover.

18. The device of claim 14, wherein the top cover slides relative to the bottom cover to open and close the housing.

* * * * *